United States Patent
Razavi

(10) Patent No.: US 6,448,349 B1
(45) Date of Patent: Sep. 10, 2002

(54) SYNDIOTACTIC/ATACTIC BLOCK POLYOLEFINS, CATALYSTS AND PROCESSES FOR PRODUCING THE SAME

(75) Inventor: Abbas Razavi, Mons (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/214,854

(22) PCT Filed: Jul. 10, 1997

(86) PCT No.: PCT/EP97/03649

§ 371 (c)(1),
(2), (4) Date: Nov. 8, 1999

(87) PCT Pub. No.: WO98/02469

PCT Pub. Date: Jan. 22, 1998

(30) Foreign Application Priority Data

Jul. 11, 1996 (EP) .............................. 96111127

(51) Int. Cl.⁷ .................................. C08F 4/44
(52) U.S. Cl. ................. 526/127; 526/128; 526/170; 526/348.2; 526/348.5; 526/351; 502/152; 502/155
(58) Field of Search .................. 526/127, 128, 526/170, 348.2, 348.5, 351; 502/152, 155

(56) References Cited

U.S. PATENT DOCUMENTS 5,243,002 A * 9/1993 Razavi et al. ............ 526/170
5,475,075 A * 12/1995 Brant et al. ............ 526/348.3

\* cited by examiner

*Primary Examiner*—David W. Wu
*Assistant Examiner*—William K Cheung
(74) *Attorney, Agent, or Firm*—William D. Jackson

(57) ABSTRACT

Metallocene catalysts useful for the preparation of syndiotactic/atactic block polyolefins have the general formula $$R''(C_4R'_mC_5C_4R'_n)XMeQ$$

wherein X is an hetero-atom ligand with one or two lone pair electrons selected from the elements of Group VA or VIA which can be substituted or non-substituted; $(C_4R_m'C_5C_4R_n')$ is a fluorenyl or a symmetrically substituted fluorenyl or cyclopentadienyl ring; R' is hydrogen or hydrocarbyl radical having from 1–20 carbon atoms, a halogen, an alkoxy, and alkoxy alkyl or an alkylamino or alkylsilylo radical, each R' may be the same or different and m and n independently are 0, 1, 2, 3 or 4, with the proviso that the bilateraly symmetry is maintained; R'' is a structural bridge between X and the $(C_4R'_mC_5C_4R'_n)$ ring to impart stereorigidity; Q is a hydrocarbyl radical having 1–20 carbon atoms or is a halogen; Me is a Group IIIB, IVB, VB, or VIB metal as positioned in the Periodic Table of Elements; and Me can be in any of its theoretically possible oxidation states.

18 Claims, 2 Drawing Sheets

SYNDIOTACTIC/ATACTIC BLOCK POLYOLEFINS, CATALYSTS AND PROCESSES FOR PRODUCING THE SAME

This applications claims priority benefit of International Application No. PCT/EP97/03649 having an international filing date of Jul. 10. 1997. which claims a priority date based upon EP Application No. 96111127.5 filed Jul. 11. 1996.

FIELD OF THE INVENTION

The invention relates to a metallocene catalyst useful in preparing syndiotactic/atactic block polyolefins and to the polymers so obtained. The catalyst comprises a bridged monocyclopentadienyl metallocene in which the cyclopentadienyl ring is substituted symmetrically with respect to the active coordination positions. The invention further includes a process of preparing syndiotactic/atactic block polyolefins that comprises the use of the disclosed catalyst.

The present invention also provides for a process for polymerizing olefins having three or more carbon atoms to produce polymers with syndiotactic/atactic stereochemical configurations. The catalyst and process of the invention are particularly useful in polymerizing propylene to form a syndiotactic/atactic block polypropylene.

DESCRIPTION OF THE PRIOR ART

As known in the art, syndiotactic polymers have a unique stereochemical structure in which monomeric units having enantiomorphic configuration of the asymmetrical carbon atoms follow each other alternately and regularly in the macromolecular main chain. Syndiotactic polypropylene was first disclosed by Natta et al. in U.S. Pat. No. 3,258,455. The Natta group obtained syndiotactic polypropylene by using a catalyst prepared from titanium trichloride and diethyl aluminum monochloride. A later patent to Natta et al., U.S. Pat. No. 3,305,538, discloses the use of vanadium triacetylacetonate or halogenated vanadium compounds in combination with organic aluminum compounds for producing syndiotactic polypropylene. U.S. Pat. No. 3,364,190 to Emrick discloses a catalyst system composed of finely divided titanium or vanadium trichloride, aluminum chloride, a trialkyl aluminum and a phosphorus-containing Lewis base as producing syndiotactic polypropylene. U.S. Pat. No. 4,892,851 disclosed a metallocene catalyst for producing highly crystalline syndiotactic polyolefins.

As disclosed in these patent references and as known in the art, the structure and properties of syndiotactic polypropylene differ significantly from those of isotactic polypropylene. The isotactic structure is typically described as having the methyl groups attached to the tertiary carbon atoms of successive monomeric units on the same side of a hypothetical plane through the main chain of the polymer, e.g., the methyl groups are all above or below the plane. Using the Fischer projection formula, the stereochemical sequence of isotactic polypropylene is described as follows:

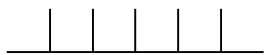

Another way of describing the structure is through the use of NMR. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is designated as:

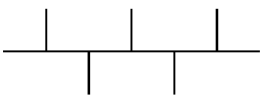

In NMR nomenclature, this pentad is described as . . . rrrr . . . in which each "r" represents a "racemic" dyad, i.e., successive methyl groups on alternate sides of the plane.

The percentage of r dyads in the chain determines the degree of syndiotacticity of the polymer. Syndiotactic polymers are crystalline and, like the isotactic polymers, are insoluble in xylene.

This crystallinity distinguishes both syndiotactic and isotactic polymers from an atactic polymer that is soluble in xylene. Atactic polymer exhibits no regular order of repeating unit configurations in the polymer chain and forms essentially a waxy product. While it is possible for a catalyst to produce all three types of polymer, it is desirable for a catalyst to produce predominantly syndiotactic or isotactic polymer with some atactic block fractions.

SUMMARY OF THE INVENTION

The invention provides for a new syndiotactic/atactic block homopolyolefins and particularly a new syndiotactic/atactic block homopolypropylene.

The present invention also provides a catalyst and process for preparing syndiotactic/atactic block polyolefins, and more particularly syndiotactic/atactic block polypropylene. The catalyst and process can each be adapted to produce a polymer with differing syndio-/atactic block ratios.

The catalyst comprises a metallocene, i.e., a metal derivative of a cyclopentadiene, and an ionizing agent. The metallocene compound contains only one substituted cyclopentadienyl ring and is of the general formula:

$$R''(C_4R'_m C_5 C_4R'_n) XMeQ$$

wherein X is an hetero-atom ligand with one or two lone pair electrons and selected from the elements of Group VA or VIA and is preferably nitrogen, phosphorus, oxygen or sulfur, which can be substituted or non-substituted; $(C_4R_m'C_5C_4R_n')$ is a fluorenyl or a symmetrically substituted fluorenyl or cyclopentadienyl ring; R' is hydrogen or hydrocarbyl radical having from 1–20 carbon atoms, a halogen, an alkoxy, and alkoxy alkyl or an alkylamino or alkylsilylo radical, each R' may be the same or different and m and n independently are 0, 1, 2, 3 or 4, with the proviso that the bilateraly symmetry is maintained; R' is a structural bridge between the X and $(C_4R'_m C_5 C_4R'_n)$ ring to impart stereorigidity and, preferably is a silyl or a hydrocarbyl biradical having at least one silicon or carbon atom to form the bridge; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; Me can be in any of its theoretically possible oxidation states. Preferred metals for the catalyst of the invention are Zr, Ti, Hf.

The term "symmetrically" shall mean that the local bilateral symmetry of the active polymerization sites is essentially maintained.

The present invention further provides a process for producing syndiotactic/atactic block polyolefins, particularly syndiotactic/atactic polypropylene. The process comprises utilizing at least one of the catalysts described by the above formula and introducing the catalyst into a polymerization reaction zone containing an olefin monomer. In addition, a cocatalyst such as alumoxane may be introduced into the reaction zone. Further, the catalyst may also be pre-polymerized prior to introducing it into the reaction zone and/or prior to the stabilization of reaction conditions in the reactor.

Metallocene catalysts are single site catalyst which, generally, produce polymer having narrow molecular weight distribution.

While the present invention is mainly directed to α-olefin homopolymerization it is obvious that copolymerization with other olefins can be obtained.

The present invention also provides for a new polymer comprising alternating blocks of syndiotactic and atactic sequences, preferably long syndiotactic and short atactic sequences, most preferably comprising a fraction of syndiotactic triads (rr) of at least 70%.

BRIEF DESCRIPTION OF THE DRAWINGS

A more complete appreciation of the invention and many of the attendant advantages thereof will be readily understood by reference to the following detailed description when considered in connection with the accompanying drawings wherein.

DETAILED DESCRIPTION OF THE INVENTION

Figure 1:
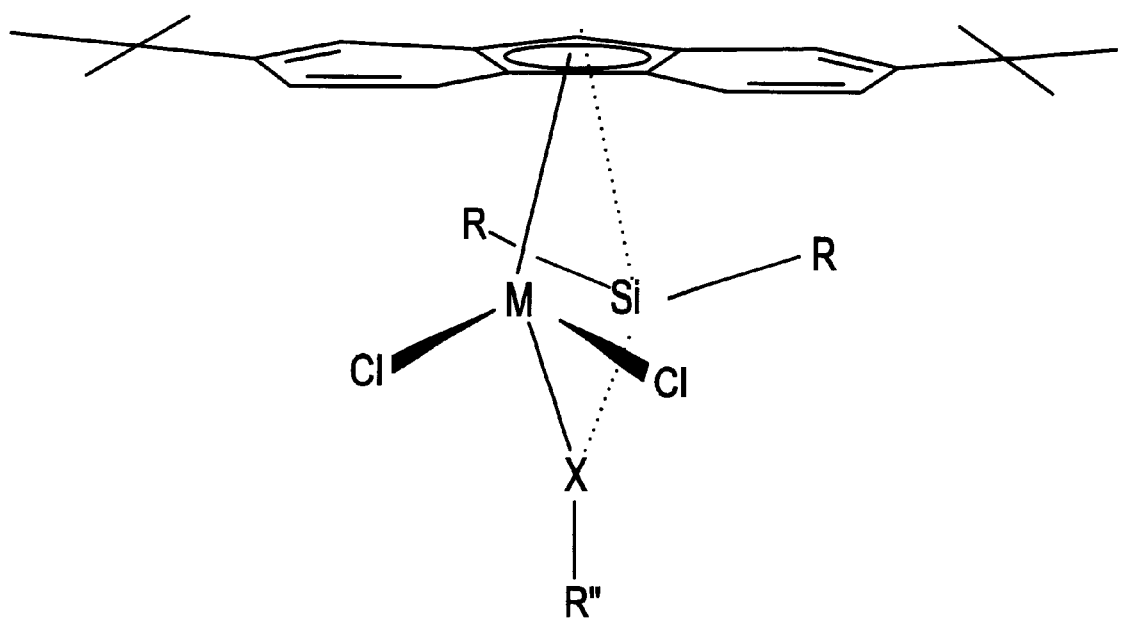
FIG. 1 shows the structure of a catalyst precursor, 2,7-bis-tert-butyl-fluorenyl-9-dimethylsylyl-tert-butyl-amido titanium dichloride.

The present invention provides for a new polymer comprising alternating blocks of syndiotactic and atactic sequences. The polymer of the invention possesses particularly long sequences of syndiotactic species and short sequences of atactic species. The syndio-/atactic ratio can easily be modified by changing the polymerization conditions and/or the catalyst structure within the invention. For example, as shown below, increasing the polymerization temperature for a given catalyst decreases the syndio-/atactic ratio. As also evidenced below, replacing a dimethylsilyl bridge by a diphenylsilyl bridge also decreases the syndio-/atactic ratio for identical polymerization conditions.

In the specific case of polypropylene, it has been noted that the new polymer has elastomeric properties. Without being bound by the theory, it may be considered that these properties are deriving from the combination of the crystalline syndiotactic part and the amorphous atactic part.

The polymer obtained has a molecular weight ranging from 100,000 to 1,000,000 depending on the polymerization conditions and on the catalyst used in the process. For example, as shown below, replacing a dimethylsilyl bridge by a diphenylsilyl bridge results in increased molecular weight under identical polymerization conditions.

The present invention provides a catalyst and process for the production of syndiotactic/atactic block polyolefins, particularly polypropylene. The catalysts of the present invention produce a polymer with a syndiotactic/atactic block microstructure.

The Applicants have now unexpectedly found that the catalyst of the invention can be used for the production of high molecular weight polyalphaolefin with stereoregular/stereoirregular block micro-structure.

When propylene or other alpha-olefins are polymerized using a catalyst consisting of a transition metal compound, the polymer product typically comprises a random mixture (reactor blend) of amorphous atactic and crystalline xylene insoluble fractions. The crystalline fraction may contain either isotactic or syndiotactic polymer or a mixture of both. The catalysts of the present invention have syndio-/atactic specificity and produce polymeric chains with differing syndio-/atactic block ratios.

The metallocene catalysts of the present invention may be described by the formula

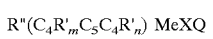

$$R''(C_4R'_mC_5C_4R'_n) \, MeXQ$$

wherein X is an hetero atom ligand with one or two lone pair electrons and selected from the elements of Group VA or VIA and is preferably nitrogen, phosphorus, oxygen or sulfur which can be substituted or not. $(C_4R'_mC_5C_4R'_n)$ is a fluorenyl ring, preferably substituted symmetrically; each R' is hydrogen or hydrocarbyl radical having from 1–20 carbon atoms, a halogen, an alkoxy, and alkoxy alkyl or an alkylamino or alkylsilylo radical, each R' may be the same or different, m and n independently are 0, 1, 2, 3 or 4, and with the proviso that the bilateral symmetry is maintained; R" is a structural bridge between the hetero atom X and $(C_4R'_mC_5C_4R'_n)$ ring to impart stereorigidity, and preferably is a silyl or hydrocarbyl biradical having at least one silicon or carbon atom to form the bridge; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; the transion metal can adopt any of the possible oxidation states. Preferred metals for the catalysts of the invention are Ti, Zr, Hf. A particularly suitable metal is Ti. $(C_4R'_4C_5C_4R'_4)$ comprises hydrocarbyl biradicals bonded to two adjacent carbon atoms in a cyclopentadienyl ring to form a fused ring.

In order to obtain syndiospecificity the cyclopentadienyl or fluorenyl rings in the metallocene catalysts must be substituted in an essentially symmetric manner with respect to the active coordination positions so that the metallocene exhibits bilateral symmetry at least around the active coordination site. It has been unexpectedly noted that if in the original syndiospecific catalysts described in U.S. Pat. No. 4,892,851 the non-substituted cyclopentadienyl is replaced by a heteroatom ligand with one or two lone pair electrons and selected from elements of Group V A or VI A, the stereospecificty of catalyst will be periodically changed from syndiospecificity to a specificity during the polymerization giving rise to the formation of atactic blocks within the predominantly syndiotactic chain.

Bilateral symmetry is defined as the condition in which there is no substituents or one or more substituents on one side and no substituents or one or more substituents on the other side in the same relative position such that a mirror image is formed from one side to another. One preferred example of such a compound is 2,7 di-tert-butyl-9-fluorenyl dimethyl silyl, tert-butyl amido titanium dichloride.

An illustration of the fluorenyl ligand of this compound with the numerical position 9 of the fluorenyl ligand indicating the bridgehead carbon atom is shown below:

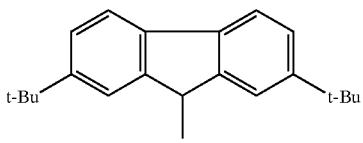

Bilateral symmetry is illustrated by a plane bisecting the fluorenyl and the bridge resulting the right side of each ligand being a mirror image of its left side. The numerical positions of the fluorenyl ring represent the position of possible substituents on the fluorenyl ring, 9 being the position of the bridge.

Whilst not wishing to be bound by a theory and without intending to limit the scope of the present invention as indicated by the claims, it is believed that during the polymerization reaction the growing polymer chain migrates from one coordination position to the other after each monomer insertion as the catalyst simultaneously isomerizes and enchains sequences of polymer of the syndiotactic structure; occasionally this mechanism is disturbed by a haptocity change of the fluorenyl-transition metal bonding or through inversion of the chiral nitrogen center, leading to the loss of steric control and formation of short sequences of atactic blocks whithin a predominantly syndiotactic polymer chain. This mechanism differs from that put forward for syndiospecific catalysts such as the active species formed from isopropylidene [cyclopentadienyl-9-fluorenyl] zirconium dichloride as disclosed in U.S. Pat. No. 4,892,851 wherein the fluorenyl ring exhibits mainly pentahapto bonding, i.e., all five carbon atoms of the fluorenyl rings are coordinated with the zirconium atom.

It is believed that the catalysts of the present invention demonstrate a reversible transformation of syndiospecific sites to atactic specific sites through a haptocity change related stereoregulation/stereoregulation mechanism.

In theory, the steric condition for a preferred orientation of the growing chain, adoption of one of the two possible conformation, intermittently disappears and the coordination and insertion of either of the propylene prochiral faces at both lateral coordination positions becomes accidental. This mechanism enchains atactic sequences in a predominantly syndiotactic polymer chain by a spontaneous change in haptocity of the bonding between the fluorenyl and the transition metal from pentahapto to tri-and possibly monohapto bonding which results in the loss of stereoregulating property of the sites.

This electro-dynamic behavior of the active species provides in effect a temporary transformation of enantiotopic, equivalent sites to non-enantiotopic, non-equivalent environment at the lateral coordination positions, atactic sequences being formed whenever this occurs. Theoretically, only when both events, i.e., periodic loss of stereoregularity and the stereospecific character of the catalyst occur simultaneously, is a syndiotactic/atactic blok homopolymer formed.

When catalysts of the present invention are used in polymerization of olefins, the polymer which results is of a syndio-/atactic microstructure as illustrated below:

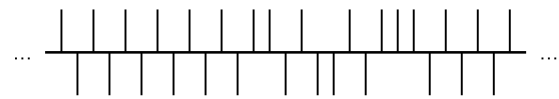

In a preferred embodiment of the catalyst of the present invention $(C_4R'_m C_5 C_4 R'_n)$ is preferably a substituted cyclopentadienyl ring with bulky substituents in 2 and 7 or positions (combined 1,8 or 3,6 or 4,5 positions are also envisageble) such as tert-butyl and trimethylsilyl; $(C_4R'_m C_5 C_4 R'_n)$ is more preferably a substituted fluorenyl radical; Me is preferably titanium, zirconium or hafnium, more preferably zirconium or titanium and most preferably titanium; Q is preferably a halogen and is most preferably chlorine; and R' is preferably a silyl or hydrocarbyl biradical of at least one silicon or carbon atom which is coordinated with the heteroatom ligand and with $(C_4R'_m C_5 C_4 R'_n)$, most preferably a silyl or hydrocarbyl biradical of at least one silicon or carbon atom being connected with heteroatom ligand and $(C_4R'_m C_5 C_4 R'R_n)$ moiety.

Exemplary hydrocarbyl biradicals for the structural bridge include ethyl, propyl, butyl, pentyl, hexyl, heptyl, octyl, nonyl, decyl, and the like. Other hydrocarbyl radicals useful as the structural bridge in the present catalysts include linear alkyl radicals of 1–10 carbon atoms or branched alkyl radicals of 1–20 carbon atoms, preferably one carbon atom, which may be substituted or unsubstituted, preferably substituted.

Exemplary silyl biradicals for structural bridge include dimethylsilyl (which is preferred), diphenylsilyl of the general formula $R_2Si=$, with each R independently being any $C_1$–$C_{20}$ hydrocarbyl or $C_1$–$C_{20}$ mono-, di- or trialkyl silyl radicals.

The catalyst may be prepared by any method known in the art. Generally, the preparation of the catalyst complex consists of forming and isolating the substituted cyclopentadienyl or fluorenyl ligands which are then reacted with a halogenated metal to form the complex. The preferred method is that disclosed in U.S. Pat. No. 4,892,851. The catalyst may further be supported on an organic or inorganic carrier. The synthesis process generally comprises the steps of (1) preparing the halogenated or alkylated metal compound, (2) preparing the ligand, (3) synthesizing the complex, and (4) purifying the complex.

The metallocene catalysts of the present invention are useful in many of the polymerization processes (solution, slurry or gas phase) known in the art including many of those disclosed for the preparation of crystalline or amorphous polypropylene. When the catalysts of the present invention are used in these types of processes, the processes produce syndiotactic/atactic block polymers.

Further examples of polymerization processes useful in the practice of the present invention include those disclosed in U.S. Pat. No. 4,767,735 and European Patent Application Publication No. 2310,734, the disclosures of which are hereby incorporated herein by reference. These preferred polymerization procedures include the step of prepolymerizing the catalyst and/or precontacting the catalyst with a cocatalyst and an olefin monomer prior to introducing the catalyst into a reaction zone.

The ionizing agent is an alumoxane, an aluminum alkyl, other Lewis acid or a combination thereof which will ionize a neutral metallocene compound to form a cationic metallocene catalyst. Examples of such ionizing agents are methyl alumoxane (MAO), triethyl aluminum (TEAl) and tris (pentafluorophenyl)boron. Other ionizing agents are disclosed in European Patent Publication Nos. 277003 and 277004 which are hereby incorporated by reference.

The syndio-/atactic-specific catalysts of the present invention are particularly useful in combination with an aluminum alkyl cocatalyst or with an alumoxane, preferably with the latter.

In addition, a complex may be isolated between a metallocene catalyst as described herein and an aluminum cocatalyst in accordance with the teachings of European Patent Publication Number 226,463. As disclosed therein, a metallocene is reacted with an excess of alumoxane in the presence of a suitable solvent. A complex of the metallocene and alumoxane may be isol ated and used as a catalyst in the present invention.

The alumoxanes useful in combination with the catalysts of the present invention, either in the polymerization reaction or in forming the complex disclosed above, may be represented by the general formula (R—Al—O —)$_n$ in the cyclic form a nd R(R—Al—O—)$_n$ALR$_2$ in the linear form wherein R is an alkyl group with one to five carbon atoms and n is an integer from 1 to about 20. Most preferably, R is a methyl group and the preferred alumoxane is methylalumoxane (MAO). The alumoxanes can be represented structurally as follows:

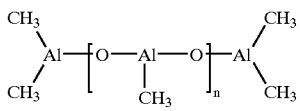

The alumoxanes can be prepared by various methods known in the art. Preferably, they are prepared by contacting water with a solution of trialkyl aluminum, such as trimethyl aluminum, in a suitable solvent such as a benzene. Another preferred method includes the preparation of alumoxane in the presence of a hydrated copper sulfate as described in the U.S. Pat. No. 4,404,344 the disclosure of which is hereby incorporated by reference. This method comprises treating a dilute solution of trimethyl aluminum in toluene with copper sulfate. The preparation of other aluminum cocatalysts useful in the present invention may be prepared by methods known to those skilled in the art.

The Examples given below illustrate the present invention and its various advantages and benefits in more detail.

EXAMPLE 1

The synthesis procedure was performed under an inert gas atmosphere using a Vacuum Atmospheres glovebox or Schlenk techniques.

Step 1 Preparation of the 2,7di- tert-butylfluorenyl-dimethylsilyl-chloride (1)

a) Aromatization of the fluorene: In a one liter flask equipped with magnetic stirring bar, nitrogen inlet and reflux condenser, there was added a solution of 0.1 mol 2,7-di-tert-butylfluorene in 300 cc of diethyl ether. To this solution was added at room temperature dropwise 0.1 equimol of methyllithium in ether (1.6 molar). The reaction was completed after gas evolution stops. The orange solution was used in the next step.

b) Reaction with dimethyldichlorosilane: The orange solution prepared in step 1a was added dropwise to a solution of 0.1 mol of dimethyldichlorosilane in 200 cc of ether. The mixture was stirred for several hours at room temperature until the reaction was completed.

Step 2. Preparation of tert-butyllithiumamide (2)

In a one liter flask equipped with magnetic stirring bar, nitrogen inlet and reflux condenser 0.1 mol of tert-butylamine was dissolved in 200 cc of diethyl ether. The solution was cooled to −78° C. One equimol of methyllithium in ether was added dropwise to the solution. The temperature was increased to room temperature slowly. The reaction mixture was stirred for several hours at room temperature until the formation of the title compound was complete.

Step 3. preparation of 2,7-di-tert-butylfluorenyl-dimethylsilyl-tert-butylamine (3)

The reaction products prepared in step 2 and step 3 were added together and stirred for several hours at room temperature. The LiCl formed as byproduct was filtered off and the ether filterate was subjected to evaporation. The title compound was obtained as a yellow oil.

Step 4. Preparation of 2,7-di-tert-butyl-dimethyl-tert-butylamido titanium dichloride (4)

a) Formation of dianion: 0.25 mol of 3 was dissolved in 200 cc of diethylether. To this solution was added dropwise 0.5 mol of methyllithium in ether. The solution became red. The reaction was stopped after gas evolution had stopped b) Reaction of the dianion with TiCl4

Figure 2:
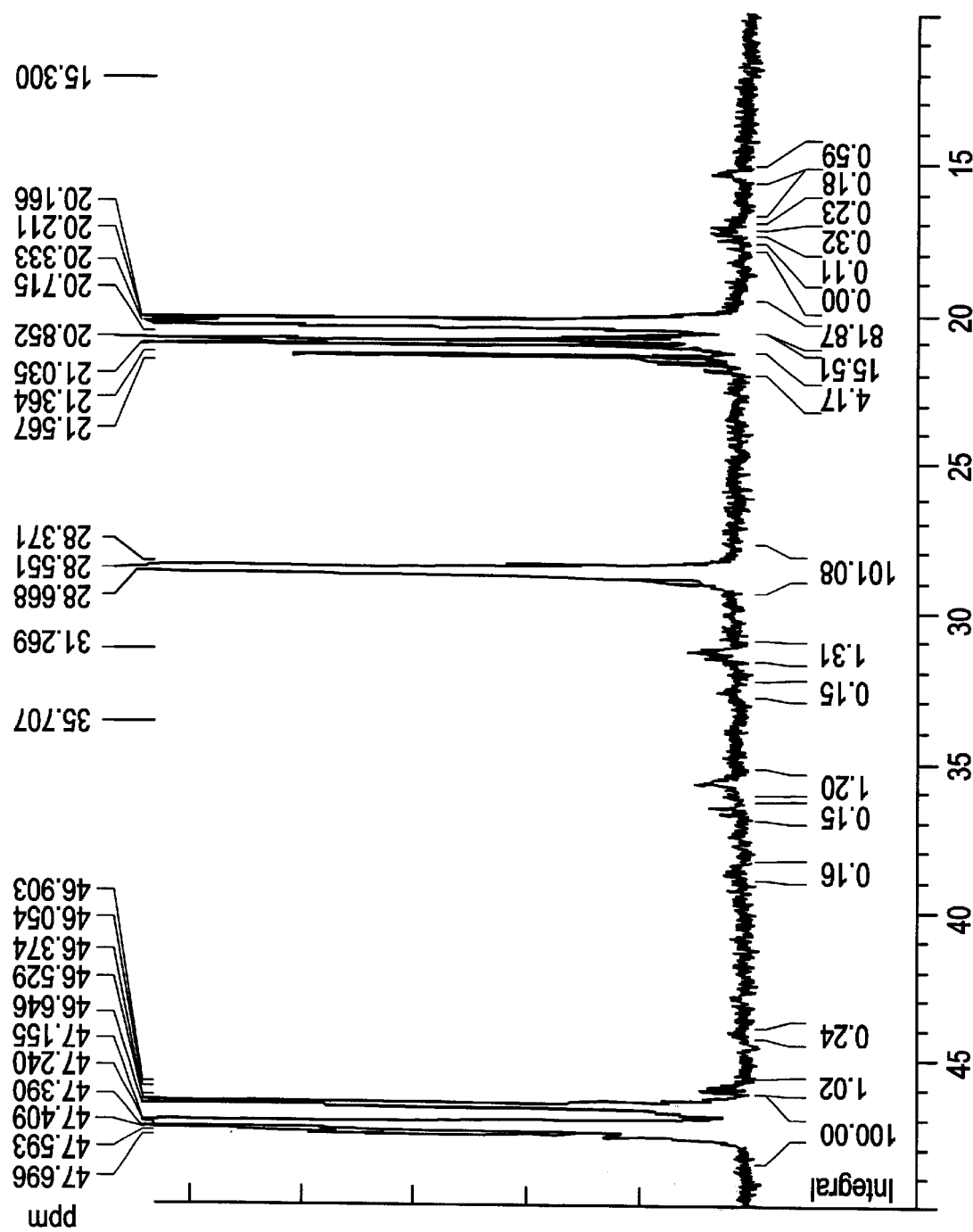
FIG. 2 shows the $^1$H NMR spectrum of the 2,7-bis-tert-butyl-fluorenyl-9-dimethylsilyl-tert-butyl-amido titanium-dichloride

The red powder obtained after evaporation of the ether from the solution resulting from step 4b was washed several times with pentane and then reacted with 0.25 mol of TiCl4 in 200 cc pentane. The mixture was stirred for several hours at room temperature and filtered to separate the LiCl. Evaporation of the solvent led to the isolation of a brown powder. Recrystalization of the product from dichloromethane provided spectroscopically pure product "4" (Cf FIG. 2 HNMR).

EXAMPLES 2 and 3

2,7-di-tert-butyl-fluorenyl-dimethylsilyl-tert-butylamido-zirconium dichloride ("5") and the corresponding hafnium derivative ("6") were formed by repeating example 1 while in step 4b respectively ZrCl4 or HfCl4 were used instead of TiCl$_4$.

EXAMPLES 4 to 6

Examples 1 to 3 were repeated while using diphenyldichlorosilane instead of dimethyldichlorosilane in step 1b. The following metallocenes were formed:
2,7-ditert-butylfluorenyldiphenylsilyltertbutylamido titaniumdichloride ("7").
2,7-ditert-butylfluorenyldiphenylsilyltertbutylamido zirconiumdichloride ("8 ").
2,7-ditert-butylfluorenyldiphenylsilyltertbutylamido hafniumdichloride ("9 ").

EXAMPLES 7–14

Propylene was polymerized using the metallocenes produced by examples 1 to 6.—Two liters of liquid propylene were introduced into a 4 liter bench reactor at room temperature. The metallocene was placed in three milliliters of a 11% solution of MAO in toluene to form a solution which was added to the reactor and the temperature increased to 40° C. The polymerization reaction was allowed to run for 60 minutes during which time the reactor was maintained at the temperature indicated in Tab. 1 for each individual run. The reaction was terminated by venting the reactor of monomer. The catalyst activity in grams of polypropylene per grams of catalyst per hour was calculated. The molecular weight, molecular weight distrubution and $^{13}$C NMR analysis of the polymer were determined. The results are shown in Table 1.

Example 7: polymerization of propylene with "4" at 60° C. FIG. 3 shows the $^{13}C$ NMR spectrum of the syndiotactic/atactic block polypropylene; signals at about 15.3, 17.5, 31.2 and 35.7 may be due to long-chain branching.

Example 8: polymerization of propylene with "4" at 80° C.

example 9: polymerization of propylene with "4" at 40° C.

Example 10: polymerization of propylene with "4" at 60 C. in 1 liter of cyclohexane Example 11: copolymerization of propylene and ethylene with "4" at 60° C.

Example 12: polymerization of propylene with "5" at 60° C.

Example 13: polymerization of propylene with "6" at 60° C.

Example 14: polymerization of propylene with "7" at 60° C.

The polymerization conditions and results are summarized in Table 1.

TABLE 1 polymerization conditions and results with 4, 5, 6 and 7.

| CATA | Polym. Temp. deg. C. | | Catalyst (mg) | Polymer (g) | Activity (g/g · h) | Mn fluff (KDa) | Mw fluff (KDa) | Mz fluff (KDa) | MWD | mm (%) | rr (%) | mr (%) |
|---|---|---|---|---|---|---|---|---|---|---|---|---|
| 4 | 60 | Bulk | 1.1 | 180 | 160000 | 98 | 317 | 835 | 3.2 | 3.75 | 79.86 | 16.39 |
| 4 | 80 | Bulk | 2.1 | 150 | 75000 | — | — | — | — | 4.9 | 72.74 | 22.36 |
| 4 | 40 | Bulk | 3.2 | 86 | 27000 | 157 | 405 | 969 | 2.6 | 3.91 | 83.37 | 12.72 |
| 4 | 60 | in cC6 | 2.4 | 124 | 52560 | 114 | 297 | 631 | 2.6 | 3.71 | 74.6 | 21.69 |
| 4 | 60 | C3—/C2— | 3.4 | 150 | 50000 | 94 | 338 | 831 | 3.6 | 2.35 | 80.72 | 16.93 |
| 5 | 60 | Bulk | 3.8 | 250 | 66000 | 1.1 | 19 | — | — | 3.8 | 85.54 | 10.67 |
| 6 | 60 | Bulk | 4.2 | 2 | 952 | — | — | — | — | — | — | — |
| 7 | 60 | Bulk | 2.4 | 45 | 18750 | 190 | 687 | 1630 | 3.6 | 6.03 | 72.08 | 21.89 | cC6: Cyclohexane
—: not determined

What is claimed is:

1. A catalyst for the polymerization of olefins of general formula:

R"(C$_4$R'$_m$C$_5$C$_4$R'$_n$)XMeQ 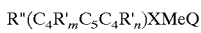

wherein X is an hetero-atom ligand with one or two lone pair electrons selected from the elements of Group VA or VIA which can be substituted or non-substituted; (C$_4$R'$_m$C$_5$C$_4$R'$_n$) is a symmetrically substituted fluorenyl group so that the ligand exhibits bilateral symmetry; R' is a substituent on the fluorenyl group and is a hydrocarbyl radical having from 1–20 carbon atoms, a halogen, an alkoxy, and alkoxy alkyl or an alkylamino or alkylsilylo radical, each R' may be the same or different and m and n independently are 1, 2, 3 or 4, with the proviso that the bilateral symmetry is maintained; R" is a structural bridge between X and the (C$_4$R'$_m$C$_5$C$_4$R'$_n$) ring to impart stereorigidity; Q is a hydrocarbyl radical having 1–20 carbon atoms or is a halogen; Me is titanium and Me can be in any of its theoretically possible oxidation states.

2. A catalyst according to claim 1, wherein the substituent of the fluorenyl radical is 2,7 di-tert-butyl-9-fluorenyl.

3. A catalyst according to claim 1, wherein the heteroatom ligand is selected from N, P, O and S.

4. A catalyst according to claim 1, wherein R" is a silyl or hydrocarbyl biradical having at least one silicon or carbon atom to form the bridge.

5. A catalyst according to claim 4, wherein R" is dimethylsilyl.

6. A catalyst according to claim 1, wherein Q is selected from alkyl, aryl, alkenyl, alkylaryl and arylalkyl radicals.

7. A process for polymerizing an olefin monomer to form a syndiotactic/atactic block polyolefin comprising:
   a) selecting a catalyst according to claim 1;
   b) introducing the catalyst into a polymerization reaction zone containing an olefin monomer having 3 or more carbon atoms and maintaining the reaction zone under polymerization reaction conditions; and
   c) extracting a syndiotactic/atactic block polymer.

8. A process according to claim 7, wherein the monomer is propylene.

9. A syndiotactic/atactic block homopolymer of an α-olefin having 3 or more carbon atoms obtained by the process of claim 7 wherein the fraction of the syndiotactic triads is at least 70%.

10. A syndiotactic/atactic block homopolymer according to claim 9, wherein the α-olefin is propylene.

11. A syndiotactic/atactic block copolymer of two α-olefins, comprising one or more blocks as defined in claim 9 or claim 10.

12. A homopolymer or copolymer obtained by a process as defined in claim 7 or claim 8.

13. The catalyst of claim 1 wherein said catalyst is 2,7 di-tert-butyl-9-fluorenyl di-methylsilyl, tert-butyl amido titanium dichloride.

14. A catalyst for the polymerization of olefins of the general formula:

R"(C$_4$R'$_m$C$_5$C$_4$R'$_n$)XMeQ 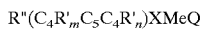

wherein X is an hetero-atom ligand with one or two lone pair electrons selected from the elements of Group VA or VIA which can be substituted or non-substituted; (C$_4$R'$_m$C$_5$C$_4$R'$_n$) is a 2,7 di-tert butyl-9-fluorenyl group so that the ligand exhibits bilateral symmetry; R" is a structural bridge between X and the 2,7 di-tert-butyl-9-fluorenyl group to impart stereorigidity; Q is a hydrocarbyl radical having 1–20 carbon atoms or is a halogen; Me is titanium and Me can be in any of its theoretically possible oxidation states.

15. A catalyst according to claim 14, wherein the heteroatom ligand is selected from N, P, O and S.

16. A catalyst according to claim 14, wherein R" is a silyl or hydrocarbyl biradical having at least one silicon or carbon atom to form the bridge.

17. A catalyst according to claim 16, wherein R" is a dimethylsilyl.

18. A catalyst according to claim 14, wherein Q is selected from alkyl, aryl, alkenyl, alkylaryl and arylalkyl radicals.

* * * * *

UNITED STATES PATENT AND TRADEMARK OFFICE
CERTIFICATE OF CORRECTION

PATENT NO. : 6,448,349 B1 Page 1 of 1
DATED : September 10, 2002
INVENTOR(S) : Abbas Razavi It is certified that error appears in the above-identified patent and that said Letters Patent is hereby corrected as shown below:

Column 2,
Line 58, replace "R'" with -- R" --;

Column 5,
Line 42, replace "stereoregulation" with -- stereoderegulation --;

Column 6,
Line 16, replace "R'" with -- R" --; and
Line 57, replace "2310,734" with -- 310,734 --.

Column 9,
Line 11, replace "60 C. in" with -- 60°C in --

Signed and Sealed this

Thirteenth Day of January, 2004

JON W. DUDAS
*Acting Director of the United States Patent and Trademark Office*